United States Patent
Hush et al.

(10) Patent No.: US 11,681,797 B2
(45) Date of Patent: Jun. 20, 2023

(54) ROW ACTIVATION PREVENTION USING FUSES

(71) Applicant: Micron Technology, Inc., Boise, ID (US)

(72) Inventors: Glen E. Hush, Boise, ID (US); Richard C. Murphy, Boise, ID (US); Honglin Sun, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 437 days.

(21) Appl. No.: 16/553,421

(22) Filed: Aug. 28, 2019

(65) Prior Publication Data

US 2021/0064743 A1    Mar. 4, 2021

(51) Int. Cl.
G06F 21/55 (2013.01)
G06F 21/79 (2013.01)
G11C 17/18 (2006.01)
G11C 17/16 (2006.01)

(52) U.S. Cl.
CPC ............ *G06F 21/554* (2013.01); *G06F 21/79* (2013.01); *G11C 17/16* (2013.01); *G11C 17/18* (2013.01); *G06F 2221/034* (2013.01)

(58) Field of Classification Search
CPC .. G06F 21/554; G06F 21/79; G06F 2221/034; G11C 17/16; G11C 17/18
See application file for complete search history.

(56) References Cited

U.S. PATENT DOCUMENTS

| 5,050,095 | A | 9/1991 | Samad | |
| 6,865,098 | B1* | 3/2005 | Ichiriu | G11C 15/00 365/189.07 |
| 7,043,466 | B2 | 5/2006 | Watanabe et al. | |
| 7,444,682 | B2* | 10/2008 | Li | G06F 12/1466 726/32 |
| 7,609,552 | B2 | 10/2009 | Li et al. | |
| 8,429,352 | B2 | 4/2013 | Sinclair | |
| 8,638,602 | B1 | 1/2014 | Horn | |
| 9,111,649 | B2* | 8/2015 | Kawamura | G06F 12/1441 |
| 9,384,355 | B2* | 7/2016 | Yokoyama | G06F 21/60 |
| 9,997,257 | B1* | 6/2018 | Lee | G11C 29/76 |
| 10,108,365 | B1* | 10/2018 | Bittiestone | G11C 11/408 |
| 11,087,821 | B2* | 8/2021 | Son | G11C 11/40611 |
| 2004/0073764 | A1 | 4/2004 | Andreasson | |
| 2010/0082929 | A1* | 4/2010 | Kobayashi | G06F 12/1441 711/170 |

* cited by examiner

*Primary Examiner* — Vanthu T Nguyen
(74) *Attorney, Agent, or Firm* — Brooks, Cameron & Huebsch, PLLC (57) ABSTRACT

Apparatuses and methods can be related to preventing the activation of rows using fuses in, for example, a memory device or a computing system that includes a memory device. The preventing the activation of rows adjacent to a predefined row address range can reduce the charge leakage from the memory cells comprising the predefined row address range. Reducing the charge leakage from memory cells comprising the predefined row address range can increase stability in data retention.

19 Claims, 5 Drawing Sheets

ROW ACTIVATION PREVENTION USING FUSES

TECHNICAL FIELD

The present disclosure relates generally to memory, and more particularly to apparatuses and methods associated with preventing a row from being activated utilizing fuses of a memory device.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

Various computing systems include a number of processing resources that are coupled to memory (e.g., a memory system), which is accessed in association with executing a set of instructions (e.g., a program, applications, etc.). Processing resources can provide access commands to a memory device. The memory device may provide access to rows of a memory array responsive to receipt of the memory device. Providing access to rows of the memory array may open the row to security threats. There are a number of security threats that can corrupt data stored in the memory array.

DETAILED DESCRIPTION

The present disclosure includes apparatuses and methods related to preventing a row from being activated utilizing fuses of a memory device. It may be desirable to prevent a row from being activated to prevent security threats such as row hammer attacks.

As used herein, row hammer attacks access memory cells in a row of the memory array to leak the charge stored in the row of memory cells to an adjacent row of memory cells. For instance, memory cells corresponding to a particular row can be affected by a row hammer attack. Row hammer refers to undesirable changes in capacitor voltages of memory cells corresponding to a row neighboring a row being frequently accessed. As an example, a row hammer attack may be employed to intentionally alter data stored in memory by repeatedly accessing a particular row in rapid succession. The goal of a row hammer attack may be to corrupt data in an adjacent row that is not accessible.

For instance, a first row being adjacent to a second row may be accessed repeatedly over a period of time. Accessing the first row repeatedly may leak voltage from memory cells coupled to the second row to memory cells coupled to the first row. The voltage leakage may cause data corruption to data stored in the memory cells coupled to the second row. Row hammer attacks corrupt data stored in memory cells coupled to the second row by activating the memory cells coupled to the first row where the first row is adjacent to the second row. In some examples, the first row and the second row may not be adjacent but may be within a number of rows of each other.

Preventing a row hammer attack can include preventing the activation of memory cells coupled to a first number of rows adjacent to a second number of rows coupled to memory cells storing sensitive data. Preventing the activation of memory cells can include mapping an address of the first row to an address of a third row, wherein the third row can be a redundant row. Mapping the first row to a redundant row can provide for the activation of memory cells coupled to the third row and not the activation of memory cells coupled to the first row. Activating the third row may not result in voltage leak from memory cells of the second row to memory cells of the third row because the third row is not adjacent to the first row.

In some examples, rows of a memory array may be mapped responsive to detecting a row hammer attack. The row hammer attack may be detected by the memory device or a processing resource external to the memory device. Detecting a row hammer attack may include detecting the target row and/or memory cell of the row hammer attack. Detecting a target row and/or memory cell can include detecting a number of rows and/or memory cells that are targeted by a row hammer attack. The number of rows and/or memory cells can be detected by detecting a quantity of accesses of the rows and/or memory cells in a time period. Responsive to detecting the row, the control circuitry may remap the detected row to a redundant row utilizing a number of fuses. In some examples, a row may be mapped responsive to detecting a row hammer attack without identifying a target row of the row hammer attack. For example, if sensitive data is stored in a row of the array, the row and/or rows adjacent to the row may be mapped to redundant rows regardless of the target of the row hammer attack.

As used herein, memory cells and/or rows can be adjacent to each other if the memory cells and/or rows are physically located next to each other in a memory array or if there is physical proximity sufficient to allow for the leakage of a charge from memory cells coupled to a row to different memory cells coupled to a different row. A row of memory cells can be next to a different row of memory cells if the addresses of the rows are consecutive and/or if there are no other rows between the adjacent rows. Memory cells may be adjacent to each other if the memory cells are coupled to rows that are adjacent to each other.

The regions of the memory array that are protected from charge leakage can be referred to as protected regions. The protected regions can be accessed utilizing a key. The key can be used to unlock the protected region. Unlocking the protected region can allow control circuitry of the memory device to activate memory cells of the protected region. As used herein, locking and unlocking can refer to allowing data to be read from and/or written to a memory array of a memory device. For instance, locking a protected region may prevent data from being written to a region of a memory array and/or prevent data from being read from a region of a memory array. Unlocking a protected region may allow data to be written to a region of a memory array and/or allow data from being read from a region of a memory array. Locking and unlocking a protected region may allow for a key corresponding to the protected region to be updated and/or may prevent a key corresponding to the protected region from being updated. Locking and unlocking a protected region may allow the defining or redefining of the protected region including setting the address range corresponding to the protected region.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Figure 1:
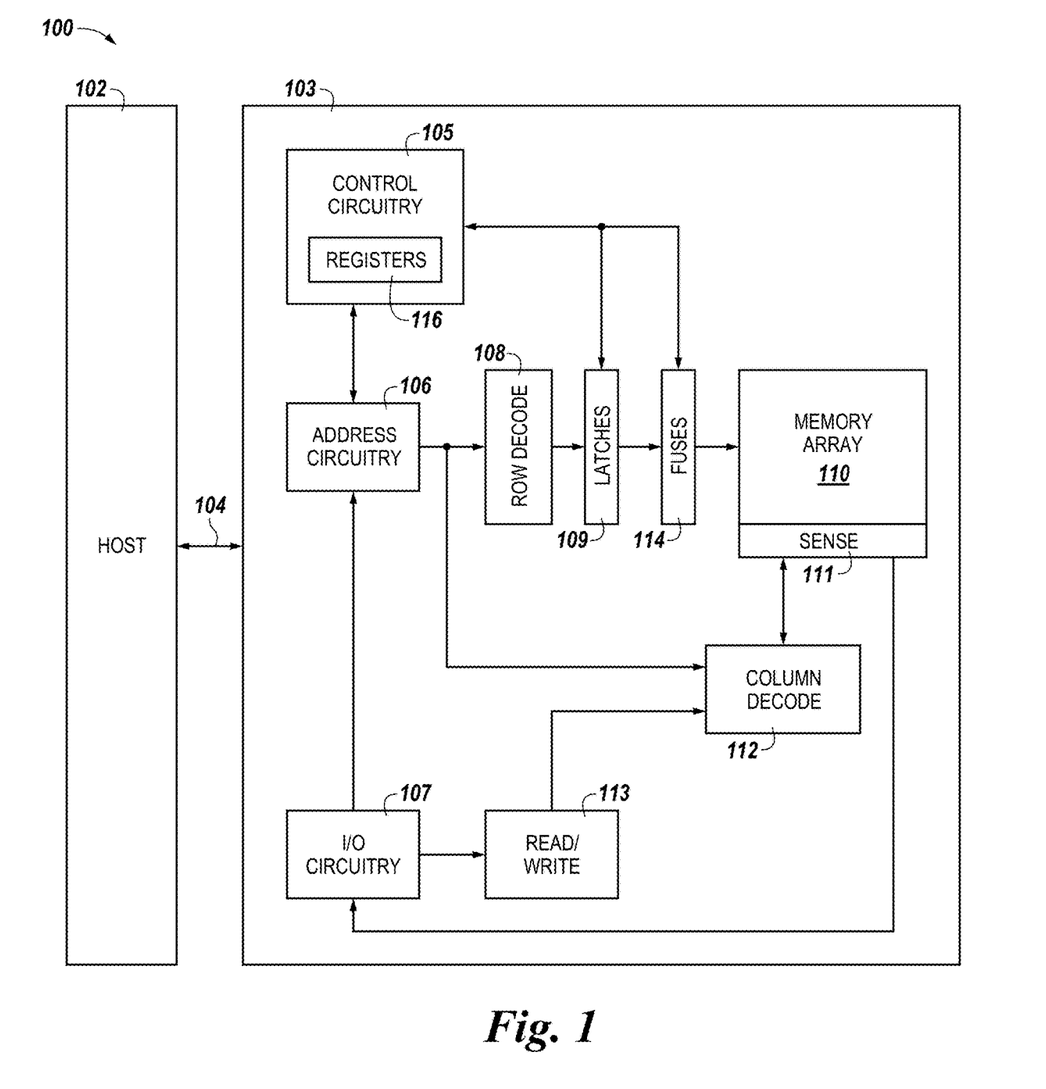
FIG. 1 is a block diagram of an apparatus in the form of a computing system including a memory device in accordance with a number of embodiments of the present disclosure.

FIG. 1 is a block diagram of an apparatus in the form of a computing system 100 including a memory device 103 in accordance with a number of embodiments of the present disclosure. As used herein, a memory device 103, a memory array 110, and/or a host 102, for example, might also be separately considered an "apparatus."

In this example, system 100 includes a host 102 coupled to memory device 103 via an interface 104. The computing system 100 can be a personal laptop computer, a desktop computer, a digital camera, a mobile telephone, a memory card reader, or an Internet-of-Things (IoT) enabled device, among various other types of systems. Host 102 can include a number of processing resources (e.g., one or more processors, microprocessors, or some other type of controlling circuitry) capable of accessing memory 120. The system 100 can include separate integrated circuits, or both the host 102 and the memory device 103 can be on the same integrated circuit. For example, the host 102 may be a system controller of a memory system comprising multiple memory devices 103, with the system controller 102 providing access to the respective memory devices 103 by another processing resource such as a central processing unit (CPU).

In the example shown in FIG. 1, the host 102 is responsible for executing an operating system (OS) and/or various applications (e.g., processes) that can be loaded thereto (e.g., from memory device 103 via control circuitry 105). The OS and/or various applications can be loaded from the memory device 103 by providing access commands from the host 102 to the memory device 103 to access the data comprising the OS and/or the various applications. The host 102 can also access data utilized by the OS and/or various applications by providing access commands to the memory device 103 to retrieve said data utilized in the execution of the OS and/or the various applications.

For clarity, the system 100 has been simplified to focus on features with particular relevance to the present disclosure. The memory array 110 can be a DRAM array, SRAM array, STT RAM array, PCRAM array, TRAM array, RRAM array, NAND flash array, and/or NOR flash array, for instance. The array 110 can comprise memory cells arranged in rows coupled by access lines (which may be referred to herein as word lines or select lines) and columns coupled by sense lines (which may be referred to herein as digit lines or data lines). Although a single array 110 is shown in FIG. 1, embodiments are not so limited. For instance, memory device 103 may include a number of arrays 110 (e.g., a number of banks of DRAM cells).

The memory device 103 includes address circuitry 106 to latch address signals provided over an interface 104. The interface can include, for example, a physical interface employing a suitable protocol (e.g., a data bus, an address bus, and a command bus, or a combined data/address/command bus). Such protocol may be custom or proprietary, or the interface 104 may employ a standardized protocol, such as Peripheral Component Interconnect Express (PCIe), Gen-Z, CCIX, or the like. Address signals are received and decoded by a row decoder 108 and a column decoder 112 to access the memory array 110. Data can be read from memory array 110 by sensing voltage and/or current changes on the sense lines using sensing circuitry 111. The sensing circuitry 111 can comprise, for example, sense amplifiers that can read and latch a page (e.g., row) of data from the memory array 110. The I/O circuitry 107 can be used for bi-directional data communication with the host 102 over the interface 104. The read/write circuitry 113 is used to write data to the memory array 110 or read data from the memory array 110. As an example, the circuitry 113 can comprise various drivers, latch circuitry, etc.

Control circuitry 105 decodes signals provided by the host 102. The signals can be commands provided by the host 102. These signals can include chip enable signals, write enable signals, and address latch signals that are used to control operations performed on the memory array 110, including data read operations, data write operations, and data erase operations. In various embodiments, the control circuitry 105 is responsible for executing instructions from the host 102. The control circuitry 105 can comprise a state machine, a sequencer, and/or some other type of control circuitry, which may be implemented in the form of hardware, firmware, or software, or any combination of the three. In some examples, the host 102 can be a controller external to the memory device 103. For example, the host 102 can be a memory controller which is coupled to a processing resource of a computing device.

In various examples, the control circuitry 105 can set a security mode of the memory device and/or to designate one or more protected regions of the memory device 103. A security mode can include a locked mode and an unlocked mode. The memory device 103 can be configured to provide access to a protected region of the memory array 110 if the memory device 103 is in an unlocked mode or to prevent access to the protected region of the memory array 110 if the memory device 103 is in a locked mode.

The control circuitry 105 can define the protected region. For example, the control circuitry 105 can utilize a key to unlock the protected region or lock the protected region. The key can be a security token used to gain access to a protected region of the memory array 130. The key can be encrypted or unencrypted. The key can be provided by the host 102 to the memory device 103. The memory device 103 can utilize the key to access the protected region of the memory array 110. The key can be unique to a protected region of memory and/or can be associated with a plurality of protected regions of memory. The key can comprise one or more bits which can be stored in one or more registers of the memory device 103.

The protected region of the memory array 110 describes a region of the memory array 103 that is protected using the key. The protected range can be defined by a first memory address and a second memory address. The first memory address can be a starting address and the second memory address can be an ending address. In some examples, the protected range is stored as a starting address and as an offset. The offset together with the starting address can be used to generate the ending address. The protected region can be continuous from the starting address to the ending address.

In some instances, the protected region can be discontinuous. The protected region can be comprised of a plurality of portions. Each portion of the protected region can be continuous. However, each of the portions can be discontinuous from one portion to another.

In some examples, the memory array 110 can be comprised of a number of protected regions. Each of the protected regions can be defined using a starting address and an offset. Each of the starting addresses corresponding to a different protected region can be unique and/or can be a same starting address. Each of the offsets can also be a same offset or a different offset.

Data associated with a protected region can be stored in a number of registers 116. For instance, the data associated with the protected region can include the starting address, the offset, and data describing whether the protected region is locked or unlocked. The registers 116 can be mode registers among other types of data storage that can be used to implement registers.

The control circuitry 105 can also be coupled to latches 109 and fuses 114. As used herein, a fuse refers to a programmable element. Although the fuses 114 are used in the examples describe herein, a programmable element can be any suitable storage of a programmable device. The fuses 114 can comprise electronic circuitry that comprises a first state and a second state. The first state may be a default state. Responsive to entering the second state, the first may not re-enter the first state. The fuses 114 may be implemented using a plurality of hardware components such as a metal fuse, among others. The fuses 114 in their default state may be unset and a fuse that is set may be in a second state. The functionality of the "fuse" can be provided by a command issued by the controller circuitry 105, a one-time programmable (OTP) command, a physical switch on the apparatus, by a user interface, (e.g., a graphical user interface (GUI)), fuses, antifuses, or by one or more settings that can be adjusted prior to shipping the apparatus to a customer, among other enabling mechanisms.

The fuses 114 may be set by "blowing" the fuse. The term "blowing" may refer to the providing a charge to the fuses 114 such that the fuses 114 stop conducting the charge associated with the voltage in the example of a metal fuse. Fuses used in association with providing redundancy to map memory addresses (e.g., row and/or column addresses) to redundant (e.g., replacement) addresses. An example redundancy scheme is post package repair (PPR) such as that described in association with a particular standard such as DDR4.

The fuses 114 may be read. Reading a fuse 114 can include determining wither the fuse is set. The control circuitry 105 can store an address of a redundant row in the latches 109 responsive to determining that a fuse 114 is set. In examples utilizing fuses for redundancy (e.g., PPR fuses), the latches 109 may store addresses used to identify portions of the memory array that are not functioning and/or portions of the memory array that should be used instead (e.g., redundant rows and/or redundant columns).

Storing addresses in the latches 109 allows the data to be read by the control circuitry 105 and/or different components of the memory device 103. For instance, as part of a power sequence, the fuses 114 may be read and an address may be stored in the latches 109, responsive to reading the fuses 114. At a later time, the addresses stored in the latches 109 may be used to associated rows of the memory array 110 with different rows of the memory array 110. The different rows can be spare rows and/or redundant rows of the memory array 110.

In some examples, the latches 109 can be dedicated latches or multi-purpose latches. For instance, the latches 109 can be implemented in the sense circuitry 111 and/or as part of the I/O circuitry 107. FIG. 1 shows the latches 109 as dedicated latched. The addresses stored in the latches 109 can be retrieved from the registers 116 prior to storing the addresses in the latches 109.

In various instances, the memory device 103 may be implemented without latches. The fuses 114 may be used to select rows. For example, a first row may be utilized if a fuse is not set while a second row may be utilized if the fuse is set.

The fuses 114 can map rows adjacent to a protected region of the memory array 110 to redundant rows of the memory array 110. Mapping the adjacent rows to the redundant rows can prevent the adjacent rows from being activated. Preventing the adjacent rows from being activated can prevent a charge leakage from memory cells of the protected region to memory cells.

Figure 2:
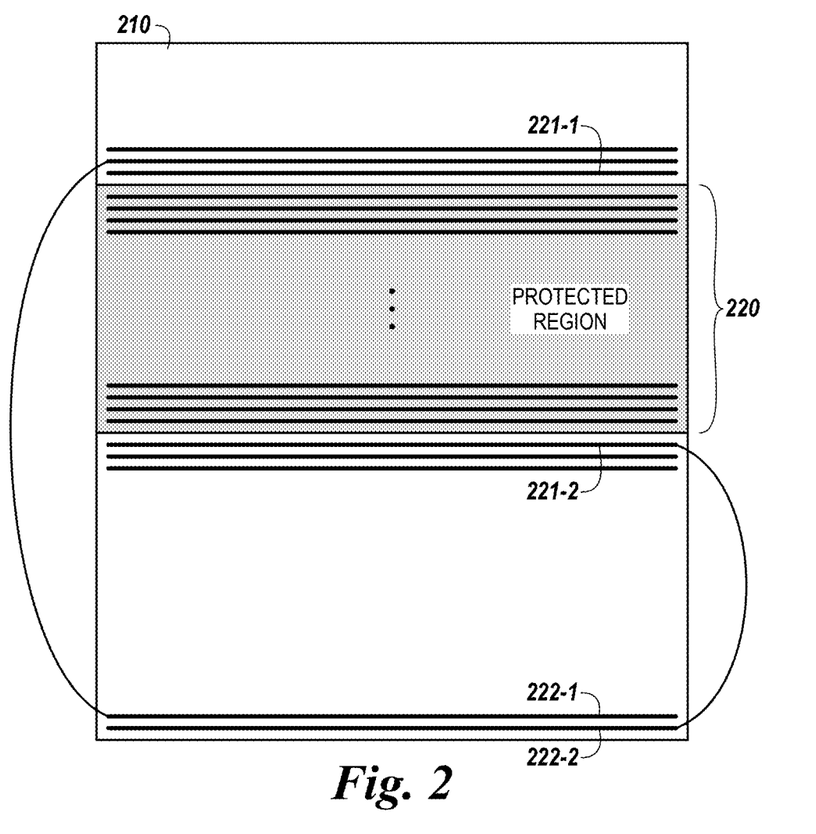
FIG. 2 is a block diagram of an apparatus in the form of a memory array in accordance with a number of embodiments of the present disclosure.

FIG. 2 is a block diagram of an apparatus in the form of a memory array 210 in accordance with a number of embodiments of the present disclosure. The memory array 210 can include a plurality of rows. The plurality of rows of the memory array 210 can represent access lines. The memory array 210 can also include sense lines (not shown). Memory cells of the memory array 210 are coupled to the access lines and the sense lines.

The memory array 210 includes rows 220 of a protected region (e.g., protected rows), a first row 221-1 adjacent to the rows 220, a second row 221-2 adjacent to the rows 220, a first redundant row 222-1, and a second redundant row 222-2. The rows 222-1 and 222-2 can be mapped to the rows 221-1 and 221-2, respectively, utilizing the fuses 114 of FIG.

1. The memory array 210 includes other rows not specifically labeled with reference numerals.

Adjacency denotes a physical proximity sufficient to allow for the leakage of a charge from memory cells coupled to a row to different memory cells coupled to a different row. In some examples, a first row can be adjacent to a second row if the first and second rows are physically proximate such that there aren't other rows between the first and the second rows.

The protected region can have multiple different sets of adjacent rows (rather than one set of rows 220). The first row 221-1 and/or the second row 221-2 can have an address that is discontinuous from the rows 220 of the protected region even though both the first rows 221-1 and second row 221-2 are adjacent to the protected region (rows 220). However, in some examples, the addresses of the first row 221-1, the second row 221-2, and the rows 220 of the protected region can be continuous.

The first redundant row 222-1 and the second redundant row 222-2 are not adjacent to the first row 221-1, the second row 221-2, and/or the rows 220 of the protected region. Memory charge may not be leaked from the first rows 221-1, the second row 221-2, and/or the rows 220 of the protected region to the first redundant row 222-1 and/or the second redundant row 222-2 due to their physical separation. In some examples, the first redundant row 222-1 and the second redundant row 222-2 may not be addressable from outside a memory device hosting the memory array 210.

In some examples, the fuses may be associated with the first row 222-1 and/or the second row 222-2. The fuses may be correlated with the rows 221-1 and 221-2 such that the rows 221-1 and 221-2 are mapped to the rows 222-1 and 222-2. Responsive to defining the protected region comprising the rows 220, the control circuitry may identify the rows 221-1 and 221-2 which are adjacent to the rows 220. The control circuitry can map the rows 221-1 and 221-2 to the rows 222-1 and 222-2 responsive to identifying the rows 221-1 and 221-2 and/or defining the protected region. The rows 221-1 can be mapped to the rows 222-1 and the rows 221-2 can be mapped to the rows 222-2. The control circuitry can map the rows 221-1 and 221-2 to the rows 222-1 and 222-2 responsive to identifying a row hammer attack.

Although the example of FIG. 2 maps individual rows to individual redundant rows, various examples can map a plurality of rows to a different plurality of rows (e.g., redundant rows). The examples of mapping individual rows to redundant rows can be applied to the remapping of pluralities of rows.

Figure 3:
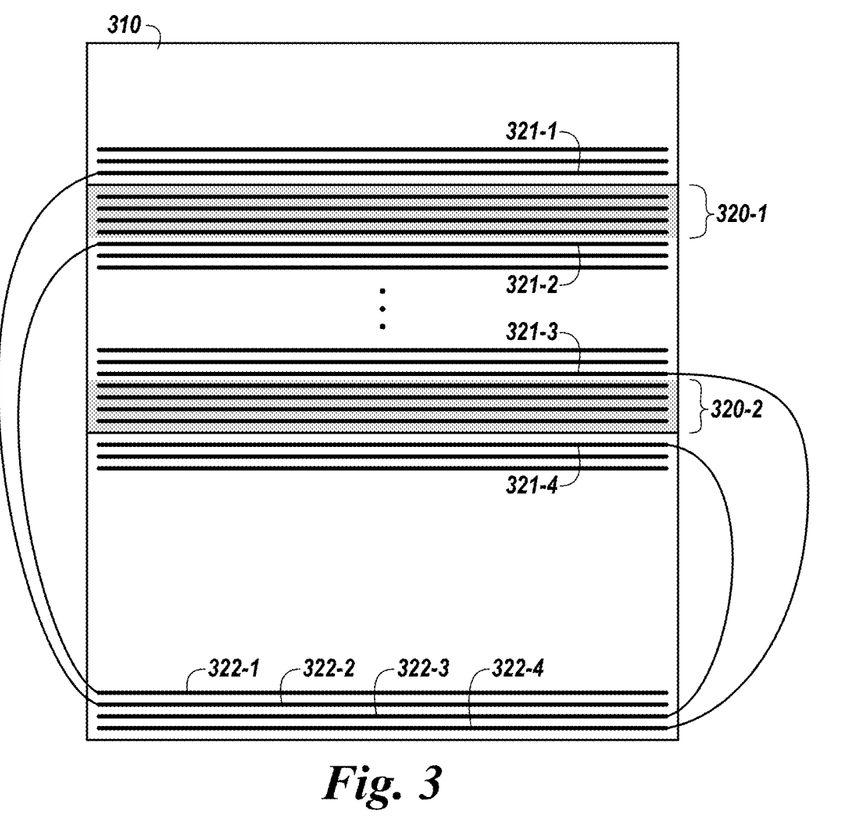
FIG. 3 is a block diagram of an apparatus in the form of a memory array in accordance with a number of embodiments of the present disclosure.

FIG. 3 is a block diagram of an apparatus in the form of a memory array 310 in accordance with a number of embodiments of the present disclosure. The memory array 310 can include the rows 321-1, 321-2, 321-3, and 321-4. The memory array 310 can also include the rows 320-1 and 320-2. The memory array 310 can further include the rows 322-1, 322-2, 322-3, and 322-4.

FIG. 3 shows a protected region that is comprised of a plurality of portions. The rows 320-1 and 320-2 can comprise a protected region. The rows 320-1 can be continuous and the rows 320-2 can be continuous. However, the rows 320-1 and 320-2 are not continuous. Rows can be continuous if the rows are next to each other without the interruption of a different row. Rows can be physically continuous and/or logically continuous. The rows comprising rows 320-1 can be continuous and discontinuous from the rows comprising rows 320-2 which are also continuous. The rows 320-1 and 320-2 can be discontinues in view of the rows 321-2 and 321-3. The rows 321-2 and 321-3 can separate the rows 320-1 and 320-2. As such, the rows comprising the protected region can be described as being discontinuous.

Each of the portions of the protected region can be implemented with adjacent rows. For example, the rows 320-1 are adjacent to the rows 321-1 and 321-2. The rows 320-2 are adjacent to the rows 321-3 and 321-4. The row 321-1 are adjacent to a first row of the rows 320-1 while the row 321-2 are adjacent to a second row of the rows 320-1, where the first row and the second row are not a same row. The rows 321-3 and 321-4 are adjacent to the rows 320-2. The row 321-3 is adjacent to a first side of the rows 320-2 while the row 321-4 is adjacent to a second side of the rows 320-2. The side of a plurality of rows can describe a row or portions of rows of the plurality of rows.

Although FIG. 3 shows a protected region as having two portions, different examples can implement a protected region (e.g., discontinuous protected region) having more than two portions. Each of the rows 321-1, 321-2, 321-3, and 321-4 can be mapped to the rows 322-1, 322-2, 322-3, 322-4, respectively. For instance, the row 321-1 is mapped to the row 322-1, the row 321-2 is mapped to the row 322-2, the row 321-3 is mapped to the row 322-3, and the row 321-4 is mapped to the row 322-4. Although the rows 321-1, 321-2, 321-3, 321-4, 322-1, 322-2, 322-3, and 322-4 are shown as single rows each of the rows 321-1, 321-2, 321-3, 321-4, 322-1, 322-2, 322-3, and 322-4 can represent multiple rows that are adjacent to the rows 320-1 and 320-2. The examples described with relation to adjacency and a single row can also be applied to multiple rows. For example, the row 321-1 and rows adjacent to the row 321-1 may also be adjacent to a starting row of the rows 320-1 because charge can be leaked from memory cells coupled to the starting row to memory cells adjacent to the row 321-1.

In some examples, the protected region can be redefined. For instance, the protected rows of the protected region can be defined differently than what was previously defined. As such, a mapping between adjacent rows and redundant rows can be changed over time. For instance, a first row may be mapped to a redundant row responsive to a first defining of a protected region while a second row may be mapped to a redundant row responsive to a second defining of a protected region. Utilizing the addresses stored in the latches to map the adjacent rows to redundant rows may limit the ability to redefine the protected rows.

The mapping between adjacent rows and redundant rows of a redefined protected region can be performed utilizing latches (e.g., latches 109 in FIG. 1) configured to store the addresses based on whether the fuses are set or not set. For instance, if a fuse is set, then an address corresponding to the redundant row can be stored in the corresponding latch(es). If a fuse is not set, then addresses of redundant rows may not be stored in the latch(es). The control circuitry may communicate with the latches such that the control circuitry stores addresses in the latches. For example, the control circuitry can update the values stored in the latches after the latches where originally populated.

The addresses stored in the latches can be read from registers and/or the memory array 310 prior to being stored in the latches. As such, the mapping between adjacent rows and redundant rows can be performed without the use of fuses and/or associated latches. The use of fuses and associated latches provides the ability to utilize already existing fuses to prevent against row hammer attacks and/or other security threats targeting the adjacent rows.

The examples described herein provide for the mapping between adjacent rows and redundant rows. However, the adjacent rows can be mapped to non-redundant rows. For example, the adjacent rows can be mapped to any row of the memory device which is not an adjacent row and/or a protected row.

Figure 4:
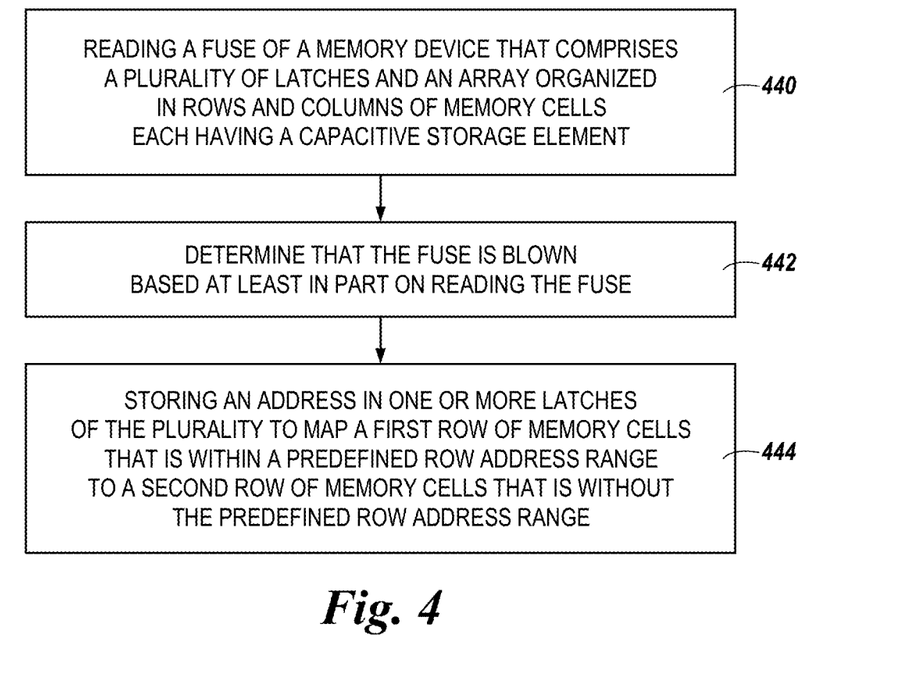
FIG. 4 illustrates an example flow diagram of a method for performing speculation in memory in accordance with a number of embodiments of the present disclosure.

FIG. 4 illustrates an example flow diagram of a method for performing speculation in memory in accordance with a number of embodiments of the present disclosure. At 440, a fuse of a memory device may be read. The memory device can comprise a plurality of latches and an array organized in rows and columns of memory cells each having a capacitive storage element. At 442, responsive to reading the fuse, a determination can be made as to whether the fuse is blown. At 444, an address can be stored in a plurality of latches to map a first row within the predefined row address range to a second row without the predefined row address range.

In various examples, a protected region and rows adjacent to the protected region can be considered a predefined row address range. Given that row adjacent to the protected region can be adjacent to a starting row or a finishing row of the protected region, first row and/or plurality of first row can be starting rows and/or finishing rows of the predefined row address range. As such, the first row can be adjacent to a protected region and within the predefined row address range.

As used herein, row may be distal if the rows are not adjacent to each other and/or if charge may not leak between the rows. For example, rows may be distal if a charge is incapable of leaking from a first row to a second row of the rows.

The address stored in the latches can correspond to the second row without the predefined row address range. For example, a blown fuse may be associated with the first row and the address stored in the latch may correspond to the second row to map the first row to the second row.

The fuses may be read responsive to a power event of the memory device. A power event can include a power up event or a power down event, among other possible power event such as a wakeup power event or a sleep power event.

In some examples, the protected regions and a corresponding predefined row address range can be updated. For instance, a starting address of the protected region can be changed such that a starting address of the predefined row address range is also changed, where the starting address of the protected region and the starting address of the pre-defined row address range are not the same. Updating a protected region and/or the predefined row address range may also be referred to as redefining a protected region and/or the predefined row address range. Updating the protected region may mean that the rows that are adjacent to the protected region may change, and, as such, the mapping between said adjacent rows and redundant rows may be updated to remain consistent with bounds of the protected region. In a dynamic system that allows the updating of the mapping between adjacent rows and redundant rows, registers that store the addresses of the adjacent rows can be updated with the addresses of the adjacent rows. Accordingly, registers that store the starting addresses or the finishing addresses of the predefined row address range can also be updated. In some examples, the addresses of the adjacent rows can also be updated in the registers. In dynamic and/or static mappings between the starting or finishing rows of the predefined row address range and redundant rows, the addresses of the staring or finishing rows and the redundant rows can be stored in latches associated with fuses that are blown. The addresses may also be stored in registers associated with the latches and/or the fuses.

The predefined row address range can be composed of a plurality of protected rows. The protected rows may be defined utilizing the addresses of the protected rows. For instance, a protected region may include a starting row having an address and an ending row having a different address. The starting row and the ending row can describe the bounds of the protected region but may not define the bounds of the predefined row address range. The predefined row address range may have different starting and/or finishing rows comprising the adjacent rows to the protected region. The second row can be adjacent to a starting row of the protected region. The second row can also be adjacent to an ending row of the protected region.

Although the examples provided herein are in the context of protected regions and adjacent rows to the protected regions. The examples provided herein can also be described in terms of the predefined row address range such that the adjacent rows are starting and finishing rows of the pre-defined row address range and the protected region comprises non-starting and non-finishing rows of the predefined row address range. The starting rows can include adjacent rows to a protected region and finishing rows can also include adjacent rows of the protected region.

Figure 5:
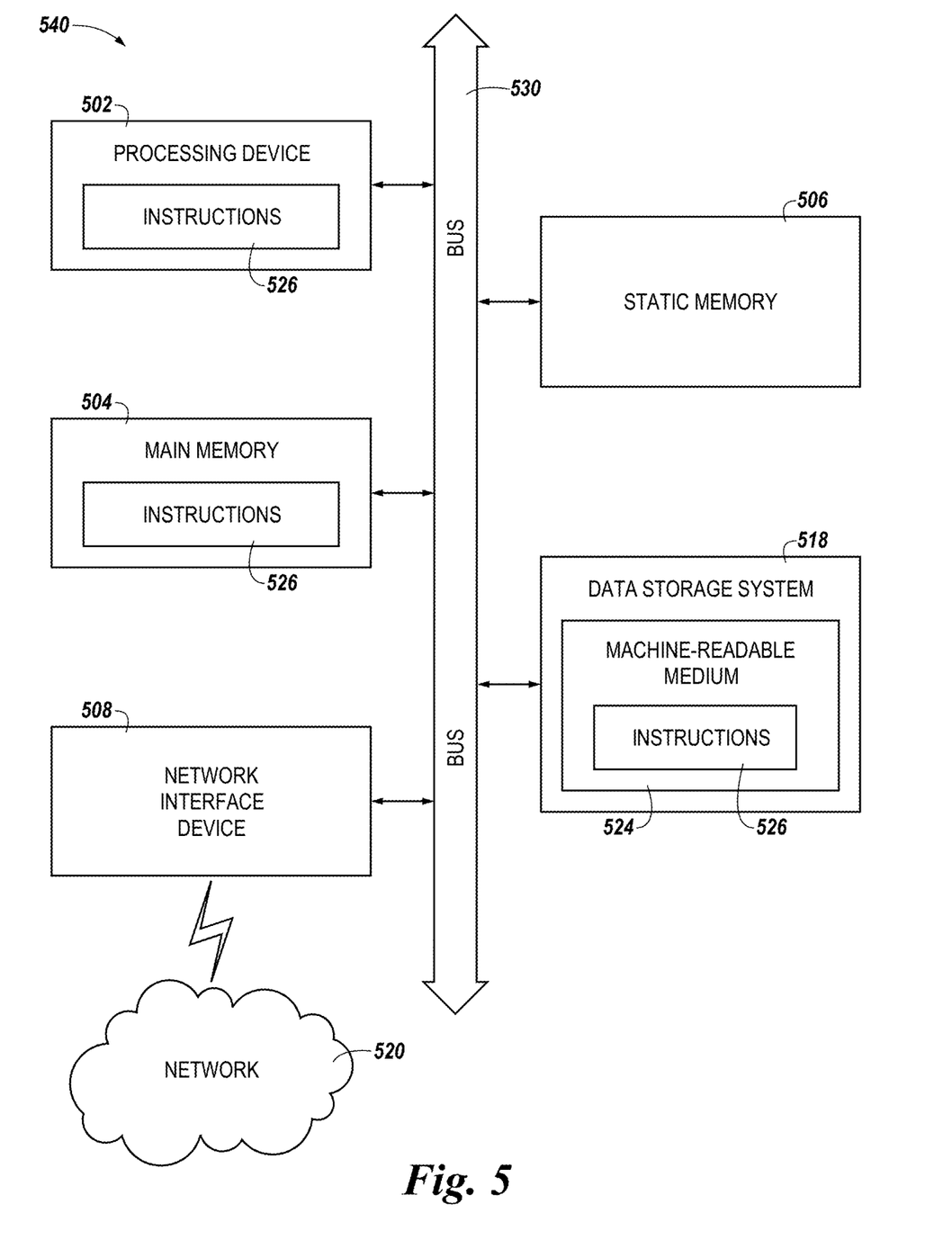
FIG. 5 illustrates an example machine of a computer system within which a set of instructions, for causing the machine to perform various methodologies discussed herein, can be executed.

FIG. 5 illustrates an example machine of a computer system 540 within which a set of instructions, for causing the machine to perform various methodologies discussed herein, can be executed. In various embodiments, the computer system 540 can correspond to a system (e.g., the system 100 of FIG. 1) that includes, is coupled to, or utilizes a memory sub-system (e.g., the memory device 103 of FIG. 1) or can be used to perform the operations of a controller (e.g., the controller 105 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 540 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 540 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 540, the main memory 504 and the processing device 502 also constituting machine-readable storage media.

In one embodiment, the instructions 526 include instructions to implement functionality corresponding to the host 102 and/or the memory device 103 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
    a memory array; and
    control circuitry coupled to the memory array and configured to:
        detect a row hammer attack targeting a first plurality of rows of memory cells that is adjacent to each of a plurality of portions of a predefined row address range of the memory array organized in rows and columns of memory cells each having a capacitive storage element,
            wherein the predefined row address range is accessed utilizing a key provided by a host, wherein the key is a security token;
            wherein the plurality of portions of the predefined row address range is not continuous and the first plurality of rows of memory cells are not continuous; and
        blow a fuse to store an address in one or more latches to map the first plurality of rows of memory cells to a second plurality of rows of memory cells that is not within the predefined row address range, wherein the second plurality of rows are continuous, and wherein the address corresponds to the second plurality of rows.

2. The apparatus of claim 1, wherein the control circuitry is further configured to map the first plurality of rows from a plurality of rows adjacent to the predefined row address range to the second plurality of rows that is not within the predefined row address range.

3. The apparatus of claim 1, wherein the control circuitry configured to detect row hammer attack is further configured to detect a quantity of accesses of the first plurality of rows and rows in the predefined row address range in a time period.

4. The apparatus of claim 1, wherein the control circuitry is further configured to define the predefined row address range of the memory array.

5. The apparatus of claim 4, wherein the control circuitry is further configured to identify the first plurality of rows responsive to defining the predefined row address range of the memory array.

6. The apparatus of claim 1, wherein the first plurality of rows has a starting address adjacent to the predefined row address range.

7. The apparatus of claim 1, wherein the first plurality of rows has a last address adjacent to the predefined row address range.

8. The apparatus of claim 1, wherein the controller is configured to access the predefined row address range utilizing the key stored in the apparatus.

9. The apparatus of claim 1, wherein the first plurality of rows is are adjacent to a starting row or a finishing row of the predefined row address range and the first plurality of rows is not in a protected region.

10. A method comprising:
    reading a fuse of a memory device that comprises a plurality of latches and an array organized in rows and columns of memory cells each having a capacitive storage element;
    determining that the fuse is blown based at least in part on reading the fuse;
    responsive to redefining a protected region of the array, identify a first row of memory cells that are adjacent to a predefined row address range; and
    responsive to determining that the fuse is blown and responsive to identifying the first row, storing an address in one or more latches of the plurality of latches to map the first row of memory cells to a second row of memory cells that is not within the predefined row address range, wherein the predefined row address range is accessed utilizing a key provided by a host, wherein the key is a security token, and wherein the address corresponds to the second row.

11. The method of claim 10, further comprising, reading the fuse responsive to detecting a power event of the memory device.

12. The method of claim 10, wherein the address is stored in registers of the memory device prior to being stored in the plurality of latches.

13. The method of claim 12, further comprising:
redefining the row address range;
responsive to redefining the row address range, updating the address stored in the registers of the memory device.

14. The method of claim 10, wherein the first row is adjacent to a starting row of the row address range or an ending row of the row address range.

15. An apparatus, comprising:
control circuitry configured to:
redefine a predefined row address range of a memory array organized in rows and columns of memory cells each having a capacitive storage element, wherein the predefined row address range is accessed utilizing a key provided by a host, wherein the key is a security token;
responsive to redefining the predefined row address range, identify a plurality of first rows adjacent to the predefined row address range of the memory array;
responsive to identifying the plurality of first rows and redefining the protected region, store an address in one or more latches of a plurality of latches to map the plurality of first rows of the memory array to a plurality of second rows of the memory array using fuses of the memory array, wherein the plurality of second rows is not within the predefined row address range, and wherein the address corresponds to the plurality of second rows; and
resolve access commands corresponding to the plurality of first rows of the memory array utilizing the fuses to prevent the plurality of first rows from being accessed.

16. The apparatus of claim 15, wherein the plurality of first rows is adjacent to a starting row or a finishing row of the predefined row address range.

17. The apparatus of claim 15, wherein predefined row address range is discontinuous.

18. The apparatus of claim 15, wherein the control circuitry is further configured to:
responsive to redefining the predefined row address range, identifying the plurality of first rows of the memory array; and
responsive to redefining the predefined row address range, map the plurality of first rows of the memory array using latches associated with the fuses to prevent the plurality of first rows from being accessed.

19. The apparatus of claim 15, wherein the control circuitry is further configured to, responsive to detecting a row hammer attack, map the plurality of first rows of the memory array to the plurality of second rows of the memory array using fuses of the memory array.

* * * * *